(12) United States Patent
Boehm et al.

(10) Patent No.: US 9,824,091 B2
(45) Date of Patent: Nov. 21, 2017

(54) FILE SYSTEM BACKUP USING CHANGE JOURNAL

(75) Inventors: Branton Nicolas Boehm, Issaquah, WA (US); Apurva Ashwin Doshi, Seattle, WA (US); Juan-Lee Pang, Redmond, WA (US); Grigory Borisovich Lyakhovitskiy, Bothell, WA (US); Sarosh Cyrus Havewala, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 383 days.

(21) Appl. No.: 12/959,401

(22) Filed: Dec. 3, 2010

(65) Prior Publication Data

US 2012/0143825 A1    Jun. 7, 2012

(51) Int. Cl.
G06F 17/30    (2006.01)
G06F 11/14    (2006.01)

(52) U.S. Cl.
CPC .... *G06F 17/30144* (2013.01); *G06F 11/1451* (2013.01); *G06F 11/1458* (2013.01); *G06F 17/30073* (2013.01); *G06F 17/30191* (2013.01); *G06F 17/30368* (2013.01); *G06F 2201/84* (2013.01)

(58) Field of Classification Search
CPC ......... G06F 17/30123; G06F 17/30221; G06F 17/30368; G06F 17/30144
USPC ....................................................... 707/648
See application file for complete search history.

(56) References Cited

U.S. PATENT DOCUMENTS

| 5,983,171 A | 11/1999 | Yokoyama et al. |
| 6,076,051 A | 6/2000 | Messerly et al. |
| 6,079,000 A | 6/2000 | Cooper et al. |
| 6,189,016 B1 | 2/2001 | Cabrera et al. |
| 6,397,308 B1 | 5/2002 | Ofek et al. |

(Continued)

FOREIGN PATENT DOCUMENTS

| CN | 1591345 A | 3/2005 |
| CN | 1783025 A | 6/2006 |

(Continued)

OTHER PUBLICATIONS

Cooperstein, et al., "Keeping an Eye on Your NTFS Drives: the Windows 2000 Change Journal Explained", Retrieved at <<http://www.microsoft.com/msj/0999/journal/journal.aspx>>, Sep. 1999, pp. 13.

(Continued)

*Primary Examiner* — Etienne Leroux
*Assistant Examiner* — Sheryl Holland
(74) *Attorney, Agent, or Firm* — Mark K. Young; Mayer & Williams PC

(57) ABSTRACT

Aspects of the subject matter described herein relate to backups and change journals. In aspects, a change journal is read to determine changes that have occurred to objects of a file system. From these changes a data structure is created to capture path information and collect changes for each object. Where the data structure is insufficient to identify a complete path, the live file system is consulted. After the data structure is complete, a data protection engine uses the data structure to update a catalog at least to provide the capability to view the namespace of the protected objects at one or more times covered by the catalog.

20 Claims, 14 Drawing Sheets

(56) References Cited

U.S. PATENT DOCUMENTS

| | | | |
|---|---|---|---|
| 6,466,901 B1 | 10/2002 | Loofbourrow et al. | |
| 6,564,016 B1 | 5/2003 | Nakajima et al. | |
| 6,625,623 B1 | 9/2003 | Midgley et al. | |
| 6,629,110 B2 | 9/2003 | Cane et al. | |
| 6,662,198 B2* | 12/2003 | Satyanarayanan et al. | 707/999.204 |
| 6,823,493 B2 | 11/2004 | Baker | |
| 7,162,587 B2 | 1/2007 | Hiken et al. | |
| 7,167,880 B2 | 1/2007 | Amano et al. | |
| 7,168,001 B2 | 1/2007 | Johnson et al. | |
| 7,240,104 B2 | 7/2007 | Gautney | |
| 7,243,094 B2 | 7/2007 | Tabellion et al. | |
| 7,272,592 B2 | 9/2007 | Wyatt et al. | |
| 7,346,586 B1 | 3/2008 | Walmsley | |
| 7,386,566 B2 | 6/2008 | Howey et al. | |
| 7,441,092 B2 | 10/2008 | Lyon | |
| 7,464,126 B2 | 12/2008 | Chen | |
| 7,480,654 B2 | 1/2009 | Jujjuri et al. | |
| 7,506,117 B2 | 3/2009 | Yamamoto et al. | |
| 7,613,750 B2 | 11/2009 | Valiyaparambil et al. | |
| 7,660,807 B2 | 2/2010 | Prahlad et al. | |
| 7,702,618 B1 | 4/2010 | Patterson | |
| 7,720,819 B2 | 5/2010 | Lazzaro et al. | |
| 7,797,323 B1 | 9/2010 | Eshghi et al. | |
| 7,801,871 B2 | 9/2010 | Gosnell | |
| 7,809,685 B2 | 10/2010 | Wolff | |
| 7,822,927 B1 | 10/2010 | Scheer | |
| 7,830,571 B2 | 11/2010 | Ishizuka et al. | |
| 7,831,561 B2 | 11/2010 | Wertheimer et al. | |
| 7,831,789 B1 | 11/2010 | Per et al. | |
| 7,860,832 B2 | 12/2010 | Midgley et al. | |
| 7,860,843 B2 | 12/2010 | Dodd et al. | |
| 7,890,714 B1 | 2/2011 | Tsaur et al. | |
| 7,899,662 B2 | 3/2011 | Brunet et al. | |
| 7,900,002 B2 | 3/2011 | Lyon | |
| 7,933,936 B2 | 4/2011 | Aggarwal et al. | |
| 8,095,516 B2 | 1/2012 | Margolus et al. | |
| 8,219,759 B2 | 7/2012 | Gokaraju et al. | |
| 8,271,996 B1 | 9/2012 | Gould et al. | |
| 8,296,398 B2 | 10/2012 | Lacapra | |
| 8,332,907 B2 | 12/2012 | Canning | |
| 8,341,367 B2 | 12/2012 | Akirav et al. | |
| 8,346,731 B1 | 1/2013 | Tsaur | |
| 8,375,008 B1 | 2/2013 | Gomes | |
| 8,417,746 B1 | 4/2013 | Gillett, Jr. | |
| 8,484,356 B1 | 7/2013 | Douglis et al. | |
| 8,527,556 B2 | 9/2013 | Vaitheeswaran | |
| 8,612,427 B2 | 12/2013 | Patterson | |
| 2001/0001870 A1 | 5/2001 | Ofek et al. | |
| 2002/0073137 A1 | 6/2002 | Meadway | |
| 2004/0010524 A1 | 1/2004 | Wallace et al. | |
| 2004/0024778 A1 | 2/2004 | Cheo | |
| 2004/0030727 A1 | 2/2004 | Armangau et al. | |
| 2004/0059870 A1 | 3/2004 | Ash et al. | |
| 2004/0088331 A1 | 5/2004 | Therrien et al. | |
| 2004/0088508 A1 | 5/2004 | Ballard et al. | |
| 2004/0093323 A1 | 5/2004 | Bluhm | |
| 2004/0210607 A1 | 10/2004 | Manchanda et al. | |
| 2005/0015466 A1 | 1/2005 | Tripp | |
| 2005/0050054 A1 | 3/2005 | Clark | |
| 2005/0076066 A1 | 4/2005 | Stakutis et al. | |
| 2005/0091271 A1 | 4/2005 | Srinivas et al. | |
| 2005/0187891 A1 | 8/2005 | Johnson | |
| 2005/0203851 A1 | 9/2005 | King et al. | |
| 2005/0210041 A1 | 9/2005 | Taguchi | |
| 2006/0053182 A1 | 3/2006 | Sen | |
| 2006/0053347 A1 | 3/2006 | van Ingen | |
| 2006/0101384 A1 | 5/2006 | Sim-Tang et al. | |
| 2006/0106813 A1 | 5/2006 | Blumenau et al. | |
| 2006/0116985 A1* | 6/2006 | Thind et al. | 707/3 |
| 2006/0117048 A1* | 6/2006 | Thind et al. | 707/101 |
| 2006/0117049 A1* | 6/2006 | Jain et al. | 707/101 |
| 2006/0117056 A1* | 6/2006 | Havewala et al. | 707/102 |
| 2006/0248039 A1 | 11/2006 | Brooks | |
| 2006/0248067 A1 | 11/2006 | Brooks | |
| 2007/0027935 A1 | 2/2007 | Haselton et al. | |
| 2007/0028063 A1 | 2/2007 | Hars et al. | |
| 2007/0038857 A1 | 2/2007 | Gosnell | |
| 2007/0136381 A1 | 6/2007 | Cannon et al. | |
| 2007/0186127 A1 | 8/2007 | Desai et al. | |
| 2007/0208918 A1 | 9/2007 | Harbin et al. | |
| 2007/0248029 A1 | 10/2007 | Merkey et al. | |
| 2007/0276843 A1 | 11/2007 | Lillibridge et al. | |
| 2008/0010322 A1 | 1/2008 | Lee et al. | |
| 2008/0034004 A1 | 2/2008 | Cisler et al. | |
| 2008/0034268 A1 | 2/2008 | Dodd et al. | |
| 2008/0091895 A1 | 4/2008 | Chen | |
| 2008/0114730 A1 | 5/2008 | Larimore et al. | |
| 2008/0243936 A1* | 10/2008 | Li et al. | 707/200 |
| 2008/0256140 A1 | 10/2008 | Lazzaro et al. | |
| 2008/0263103 A1 | 10/2008 | McGregor et al. | |
| 2008/0270396 A1 | 10/2008 | Herscovici et al. | |
| 2008/0288531 A1 | 11/2008 | Turski et al. | |
| 2009/0048860 A1 | 2/2009 | Brotman et al. | |
| 2009/0089862 A1 | 4/2009 | Sun | |
| 2009/0100115 A1 | 4/2009 | Park et al. | |
| 2009/0172273 A1 | 7/2009 | Piszczek et al. | |
| 2009/0187545 A1 | 7/2009 | Kaku et al. | |
| 2009/0199199 A1 | 8/2009 | Pooni et al. | |
| 2009/0204586 A1 | 8/2009 | Takahashi | |
| 2009/0216798 A1 | 8/2009 | Wahlert | |
| 2009/0228533 A1 | 9/2009 | Reddy et al. | |
| 2009/0235150 A1 | 9/2009 | Berry | |
| 2009/0248757 A1 | 10/2009 | Havewala et al. | |
| 2009/0292677 A1 | 11/2009 | Kim | |
| 2010/0070515 A1* | 3/2010 | Dutton et al. | 707/755 |
| 2010/0106691 A1 | 4/2010 | Preslan et al. | |
| 2010/0145917 A1 | 6/2010 | Bone et al. | |
| 2010/0161617 A1 | 6/2010 | Cao | |
| 2010/0169591 A1 | 7/2010 | Atluri et al. | |
| 2010/0274765 A1 | 10/2010 | Murphy et al. | |
| 2010/0280999 A1 | 11/2010 | Atluri et al. | |
| 2011/0010499 A1 | 1/2011 | Tsukamoto et al. | |
| 2011/0016095 A1 | 1/2011 | Anglin | |
| 2011/0055559 A1 | 3/2011 | Li et al. | |
| 2011/0066805 A1 | 3/2011 | Janschitz | |
| 2011/0113012 A1 | 5/2011 | Gruhl et al. | |
| 2011/0113466 A1 | 5/2011 | Stringham et al. | |
| 2011/0131185 A1 | 6/2011 | Kirshenbaum | |
| 2011/0173160 A1 | 7/2011 | Kryger | |
| 2011/0225141 A1 | 9/2011 | Chaudhry et al. | |
| 2011/0246721 A1 | 10/2011 | Crisan | |
| 2011/0264635 A1 | 10/2011 | Yang | |
| 2011/0264875 A1 | 10/2011 | Watanabe | |
| 2012/0078855 A1 | 3/2012 | Beatty et al. | |
| 2012/0078914 A1 | 3/2012 | Roeder et al. | |
| 2012/0130995 A1 | 5/2012 | Risvik et al. | |
| 2012/0143825 A1 | 6/2012 | Boehm et al. | |
| 2012/0158689 A1 | 6/2012 | Doshi | |
| 2012/0159078 A1 | 6/2012 | Doshi et al. | |
| 2012/0210084 A1 | 8/2012 | Carroll et al. | |
| 2013/0018928 A1 | 1/2013 | Lacapra | |
| 2013/0066830 A1 | 3/2013 | Lacapra et al. | |
| 2013/0066929 A1 | 3/2013 | Sedlar | |
| 2013/0191342 A1 | 7/2013 | Sreedharan | |
| 2013/0227604 A1 | 8/2013 | Shields et al. | |
| 2014/0074809 A1 | 3/2014 | Patterson | |
| 2014/0188811 A1 | 7/2014 | Yang et al. | |

FOREIGN PATENT DOCUMENTS

| | | |
|---|---|---|
| CN | 1783082 | 6/2006 |
| CN | 1784677 | 6/2006 |
| CN | 1991776 A | 7/2007 |
| CN | 101162469 | 4/2008 |
| CN | 101201766 | 6/2008 |
| CN | 101326497 | 12/2008 |
| CN | 101601029 | 12/2009 |
| JP | 2007-140777 | 6/2007 |
| KR | 1020090063733 A | 6/2009 |

(56) References Cited

FOREIGN PATENT DOCUMENTS

| WO | 2007/021842 A2 | 2/2007 |
|---|---|---|
| WO | 2010066816 A2 | 6/2010 |

OTHER PUBLICATIONS

"Base of a Differential Backup", Retrieved at<<http://technet.microsoft.com/en-us/library/ms188230.aspx>>, Retrieved Date: Aug. 16, 2010, p. 1.
"International Search Report", dated Jul. 24, 2012, Application No. PCT/US2011/063195, Filed Date: Dec. 3, 2011, pp. 9.
"Copernic Desktop Search Has a New Improved Index", Copernic Blog, Jul. 29, 2010.
"Desktop search tools", Pandia Resources, Retrieved Sep. 22, 2010.
Jones, "Build a Web spider on Linux", Nov. 14, 2006.
Rebbapragada, "First Look: Tiger Lives Up to the Hype", PCWorld.com, Apr. 30, 2005.
"Windows Search Overview", Microsoft Corporation, Aug. 17, 2010.
CN Search Report for Application No. 201110395113.2, dated Nov. 18, 2013.
CN First Office Action and Search Report for Application No. 201110432331.9, dated Jan. 6, 2014.
"About Google Desktop Search", Retrieved at: <<http://web.archive.org/web/20041015131838/http://desktop.google.com/about.html>>, Oct. 15, 2004, 8 Pages.
"Google—Data Retention Periods for Different Services (Including Deleted Data)", Tech and Law, Nov. 6, 2010, 8 Pages.
"Google desktop search", Retrieved at: <<http://web.archive.org/web/20100924031219/http://www.pandia.com/resources/desktop.html>>, Retrieved Date: Sep. 22, 2010, 6 Pages.
"Prevent Data Loss with Axcient: Fast Data Loss Recovery from the Unexpected", Prevent Data Loss. net, May 11, 2010, 2 Pages.
"Extended European Search Report Issued in European Patent Application No. 11845344.8", dated Sep. 15, 2014, 12 Pages.
"Notice of Allowance Issued in European Patent Application No. 11845344.8", dated May 21, 2015, 7 Pages.
"Final Office Action Issued in U.S. Appl. No. 12/958,412", dated May 5, 2015, 12 Pages.
"Final Office Action Issued in U.S. Appl. No. 12/958,412", dated Jul. 25, 2013, 24 Pages.
"Non-Final Office Action Issued in U.S. Appl. No. 12/958,412", dated Oct. 8, 2014, 11 Pages.
"Non-Final Office Action Issued in U.S. Appl. No. 12/958,412", dated Oct. 21, 2015, 18 Pages.
"Non-Final Office Action Issued in U.S. Appl. No. 12/958,412", dated Apr. 21, 2016, 18 Pages.
"Non-Final Office Action Issued in U.S. Appl. No. 12/958,412", dated Dec. 28, 2012, 16 Pages.
"Final Office Action Issued in U.S. Appl. No. 12/973,902", dated May 16, 2013, 8 Pages.
"Non-Final Office Action Issued in U.S. Appl. No. 12/973,902", dated Feb. 27, 2013, 8 Pages.
"Notice of Allowance Issued in U.S. Appl. No. 12/973,902", dated Aug. 28, 2012, 8 Pages.
"Notice of Allowance Issued in U.S. Appl. No. 12/973,949", dated Jun. 25, 2013, 13 Pages.
"Notice of Allowance Issued in U.S. Appl. No. 12/973,949", dated Aug. 20, 2013, 17 Pages.
"Final Office Action Issued in U.S. Appl. No. 13/186,490", dated Oct. 16, 2013, 26 Pages.
"Final Office Action Issued in U.S. Appl. No. 13/186,490", dated Jun. 12, 2014, 15 Pages.
"Non-Final Office Action Issued in U.S. Appl. No. 13/186,490", dated Sep. 24, 2014, 11 Pages.
"Non-Final Office Action Issued in U.S. Appl. No. 13/186,490", dated Mar. 21, 2014, 11 Pages.
"Non-Final Office Action Issued in U.S. Appl. No. 13/186,490", dated Jun. 12, 2013, 23 Pages.
"Notice of Allowance Issued in U.S. Appl. No. 13/186,490", dated Jan. 8, 2015, 14 Pages.
"Notice of Allowance Issued in U.S. Appl. No. 13/186,490", dated Sep. 2, 2015, 8 Pages.
"Final Office Action Issued in U.S. Appl. No. 14/085,699", dated Jan. 8, 2015, 12 Pages.
"Non-Final Office Action Issued in U.S. Appl. No. 14/085,699", dated May 8, 2015, 14 Pages.
"Non-Final Office Action Issued in U.S. Appl. No. 14/085,699", dated Jul. 8, 2014, 13 Pages.
"Final Office Action Issued in U.S. Appl. No. 14/085,699", dated Aug. 28, 2015, 13 Pages.
"Final Office Action Issued in U.S. Appl. No. 14/089,150", dated Aug. 27, 2015, 14 Pages.
"Final Office Action Issued in U.S. Appl. No. 14/089,150", dated Nov. 25, 2014, 11 Pages.
"Non Final Office Action Issued in U.S. Appl. No. 14/089,150", dated Aug. 22, 2014, 14 Pages.
"Non-Final Office Action Issued in U.S. Appl. No. 14/089,150", dated Mar. 27, 2015, 12 Pages.
"Non-Final Office Action Issued in U.S. Appl. No. 14/094,552", dated Feb. 14, 2014, 7 Pages.
Hejtmanek, "Scalable and Distributed Data Storage", PhD Thesis Proposal, Masaryk University, Jan. 2005, 33 Pages.
Babineau, Brian, "Next Generation NAS: A Market Perspective on the Recently Introduced Snap Server 500 Series", Enterprise Strategy Group, Jun. 2006, 5 Pages.
"Notice of Allowance Issued in Chinese Patent Application No. 201110432331.9", dated Sep. 22, 2014, 3 Pages.
"First Office Action Issued in Chinese Patent Application No. 201110394985.7", dated May 26, 2014,12 Pages.
"Notice of Allowance Issued in Chinese Patent Application No. 201110394985.7", dated Sep. 22, 2015, 4 Pages.
"Second Office Action Issued in Chinese Patent Application No. 201110432322.X", dated Aug. 28, 2014, 13 Pages.
"Office Action Issued in Chinese Patent Application No. 201110395113.2", dated Aug. 8, 2014, 7 Pages.
"Office Action & Search Report Issued in Chinese Patent Application No. 201110432322.X", dated Dec. 17, 2013, 10 Pages.
"Third Office Action Issued in Chinese Patent Application No. 201110395113.2", dated Feb. 10, 2015, 7 Pages.
"Notice of Allowance Issued in Chinese Application No. 201110432322.X", dated Mar. 18, 2015, 3 Pages.
"International Search Report & Written Opinion Issued in PCT Application No. PCT/US2011/063050", dated Jul. 25, 2012, 9 Pages.
Liang, et al., "Video Plug-in Development for Material Exchange Format", In Video Engineering(Abstract only), May 2005, 4 Pages.
Redi, "Mobile IP: A Solution for Transparent, Seamless Mobile Computer Communication", Fuji-Keizai's Report on Upcoming Trends in Mobile Computing and Communications, Jul. 1998, 10 Pages.
Satyanarayanan, et al., "Towards Seamless Mobility on Pervasive Hardware", In Pervasive and Mobile Computing, Mar. 2005, pp. 157-189.
Soules, "Metadata Efficiency in Versioning File Systems", In Proceedings of the 2nd USENIX Conference on File and Storage Technologies, Mar. 31, 2003, 16 Pages.
Xu, et al., "File Level Backup System Based on Content-addressed Storage", In Computer Engineering, vol. 36, Issue No. 16, Aug. 2010, 4 Pages.
Takasugi, et al., "Seamless Service Platform for Following a User's Movement in a Dynamic Network Environment", In Proceedings of the 1st IEEE International Conference on Pervasive Computing and Communications, Mar. 23, 2003, 8 Pages.
Xing-Hua, "Duplicated Data Detection in Multi-Version Backup", In Application Research of Computers(Abstract only), Jan. 2009, 4 Pages.

* cited by examiner

FILE SYSTEM BACKUP USING CHANGE JOURNAL

BACKGROUND

Many people who have experience with computers recognize the value of backing up data that resides on the computer. One approach to performing a backup of data on a computer is to take the computer offline, execute a backup application to copy the data on the computer, and then put the computer back online. This approach is generally not acceptable as the computer becomes unavailable to users while the backup is being performed.

Another approach to performing a backup of data on a computer is to take a snapshot of a file system and then copy files in the snapshot to a backup target. While effective in many scenarios, this approach is typically not lightweight and may cause the computer to become less responsive at certain times during the backup procedure.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to backups and change journals. In aspects, a change journal is read to determine changes that have occurred to objects of a file system. From these changes a data structure is created to capture path information and collect changes for each object. Where the data structure is insufficient to identify a complete path, the live file system is consulted. After the data structure is complete, a data protection engine uses the data structure to update a catalog at least to provide the capability to view the namespace of the protected objects at one or more times covered by the catalog.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth are used. The use of these terms, particularly in the claims, is not intended to imply an ordering but is rather used for identification purposes. For example, the phrase "first namespace record" and "second namespace record" does not necessarily mean that the first namespace record is the very first namespace record or was created before the second namespace record or even that the first namespace record is requested or operated on before the second namespace. Rather, these phrases are used to identify different namespace records.

Headings are for convenience only; information on a given topic may be found outside the section whose heading indicates that topic.

Other definitions, explicit and implicit, may be included below.

Exemplary Operating Environment

Figure 1:
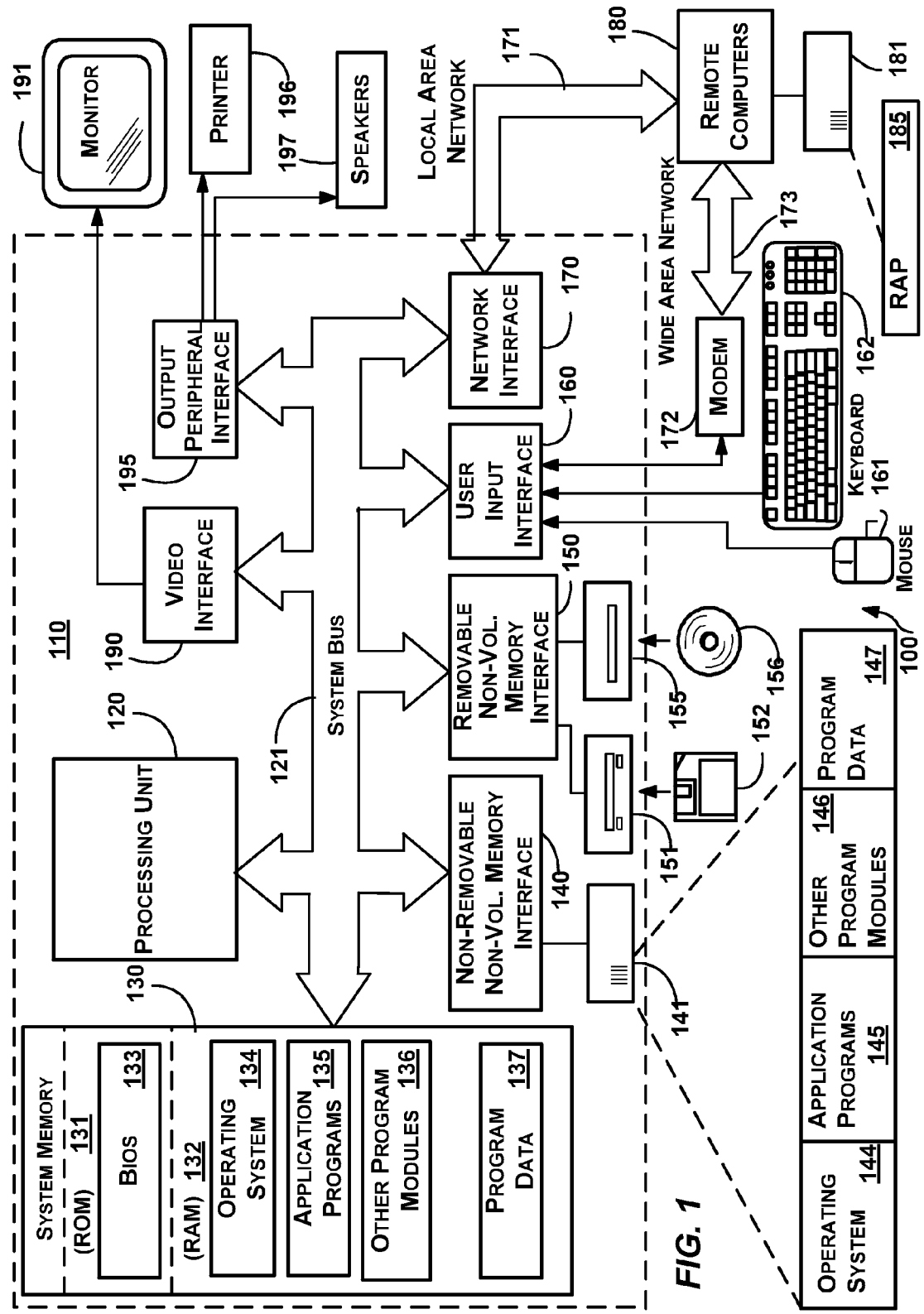
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like.

These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various components of the computer 110 may be implemented in hardware, software, or the like, or a combination two or more of the above.

Backups

Figure 2:
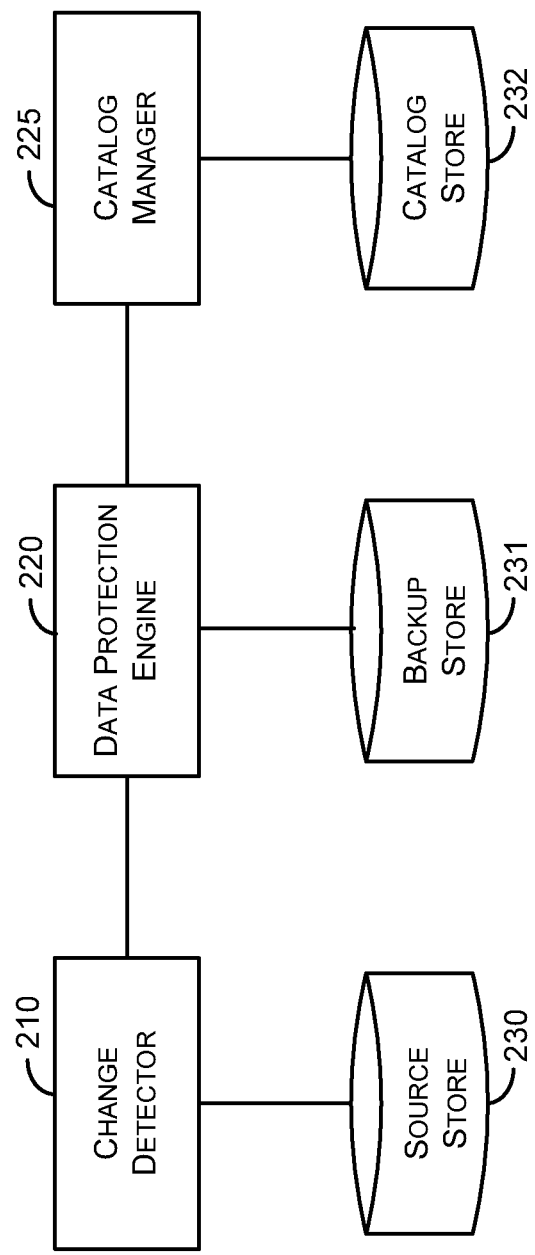
FIG. 2 is a block diagram that represents an exemplary environment in which aspects of the subject matter described herein may be implemented.

As mentioned previously, many people recognize the value in backing up data that resides on a computer. FIG. 2 is a block diagram that represents an exemplary environment in which aspects of the subject matter described herein may be implemented. The environment may include a change detector 210, a data protection engine 220, a catalog manager 225, various stores 230-232, and may include other entities (not shown). The various entities may be located relatively close to each other (e.g., on the same computer) or may be distributed across the world.

The stores 230-232 are any storage media capable of storing data. The store may include volatile memory (e.g., a cache) and non-volatile memory (e.g., a persistent storage). The term data may include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The stores 230-232 may comprise file systems, databases, volatile memory such as RAM, other storage, some combination of the above, and the like and may be distributed across multiple devices. One or more of the stores 230-232 may be implemented on the same device or devices. For example, the source store 230 and the catalog store 232 may be implemented on the same file system.

A store may include file system objects. A file system object (sometimes referred to herein as simply an object) may be a file, a directory, or the like.

The source store 230 may include multiple objects arranged in a hierarchy. For example, the source store 230 may include a root directory, subdirectories and files of the root directory, subdirectories and files of the subdirectories, and so forth. Through a backup configuration manager (not shown), all or a portion of the source store 230 may be designated for data protection. Designating a directory for data protection may cause all the descendants of the directory to also be designated for data protection. A descendant of a directory includes any subdirectories and files in the directory, subdirectories and files in those subdirectories, and so forth.

After a dataset potentially including certain directories and files has been designated for data protection, the change detector 210 may determine when changes occur to objects of the dataset. In one embodiment, the change detector 210 may determine when changes occur by reading records of a change journal.

Some file systems indicate changes to objects of the file system through a change journal. A change journal may include one or more files that describe changes to objects. For each change to an object, one or more records may be written to the change journal. Each record may include an identifier of the object, an object name, an identifier of a parent folder, an indication of the change that occurred to the object, and so forth. Each record may also be associated with a journal number.

Some types of changes may be represented by two change journal records. For example, a rename operation may move a file from one directory to another directory and/or change a name of the file. This type of operation may be represented by two records in the change journal. For example, a rename operation may be represented by a record that indicates the old name and a record that indicates the new name. When adding a new record to a change journal, a file system may assign a journal number to the record. The journal number together with an identifier identifying the journal may be used to identify the record as well as place a temporal ordering on the record. For example, records associated with lower journal numbers of a journal may describe changes that occurred prior to records associated with higher journal numbers.

By reading the change journal, the change detector 210 may determine changes that have occurred to objects of the file system. If the changes affect a namespace designated for data protection, catalog entries in the catalog store 232 may need to be updated and/or objects may need to be backed up to the backup store 231. If the changes do not affect a namespace designated for data protection, no backup and/or catalog updates may be needed. In one embodiment, the change journal may provide a full path in each record. In another embodiment, however, the change journal may not provide a full path with each record.

Figure 3:
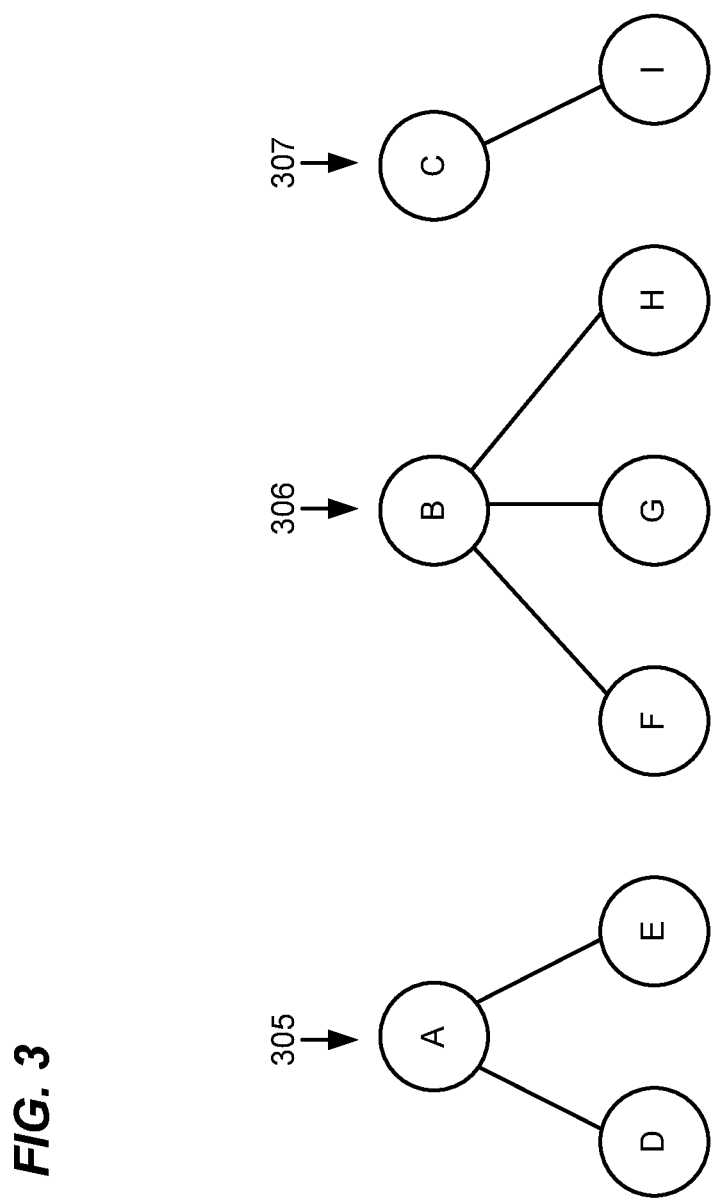
FIG. 3 is a block diagram that represents exemplary tree data structure fragments obtained from scanning a change journal in accordance with aspects of the subject matter described herein.

In the latter case, the change detector 210 may need to determine a full path of an object associated with a record before determining whether the object affects a namespace designated for data protection. This may be done in a two phase process. In the first phase, the change detector 210 may read the change journal record by record and create tree data structure fragments such as, for example, those illustrated in FIG. 3. Turning to FIG. 3, note that there are three tree data structure fragments 305-307. Each of the nodes of these fragments 305-307 may have information such as that illustrated in FIG. 5.

The change detector 210 builds the tree data structure fragments of FIG. 3 incrementally, connecting the nodes when possible. For example, a record will include an identifier of an object and an identifier of a parent of the object. If a node for the object already exists, the node for the object may be updated based on the change that occurs. If a node already exists that corresponds to the parent identifier included in the record, the nodes may be connected (e.g., by updating one or more pointers) in a parent/child relationship.

Figure 4:
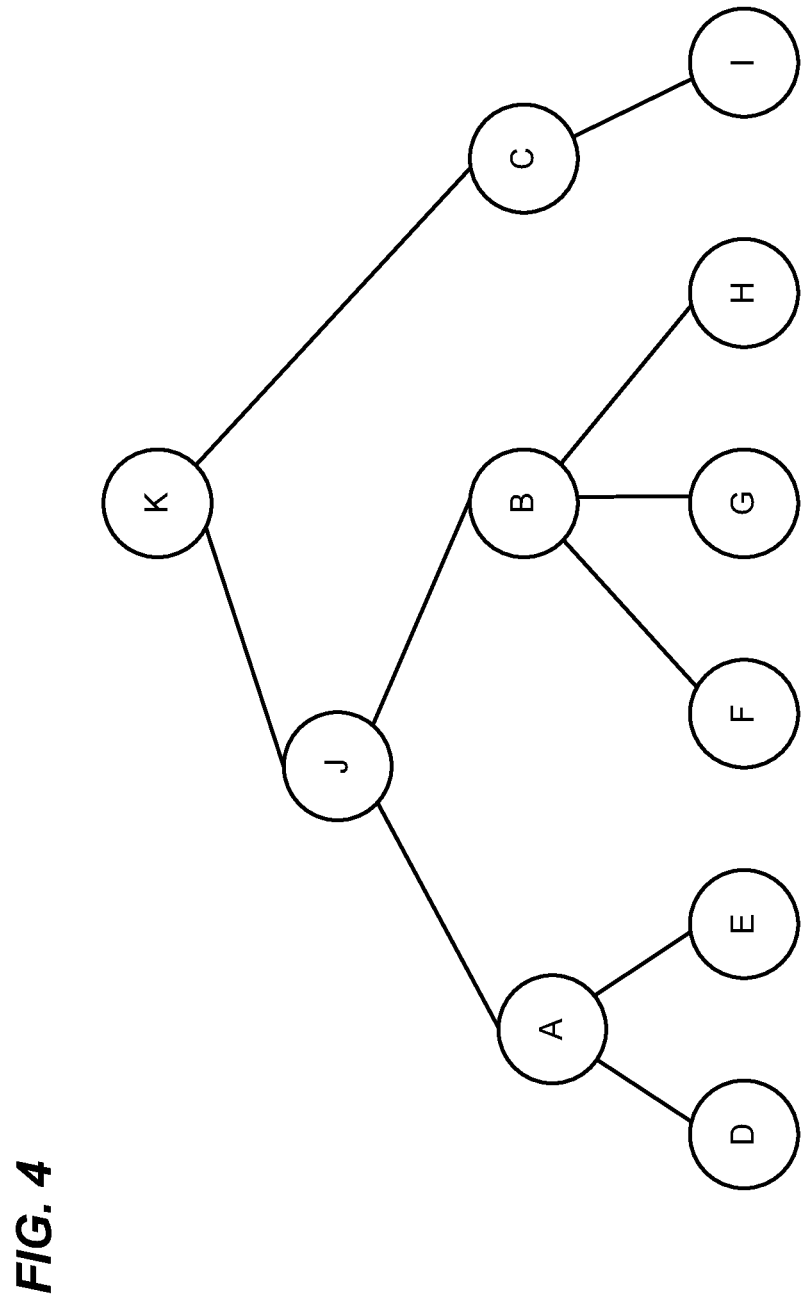
FIG. 4 illustrates an example of a completed tree based on the tree data structure fragments of FIG. 3 in accordance with aspects of the subject matter described herein.

Eventually, the change detector 210 may come to the end of the change journal or may process a selectable number of records. At this point, there may be several tree data structure fragments that are not fully connected in a tree data structure. At this point, phase two begins by filling in the rest of the tree by querying the live file system. At the end of the process, a tree that includes the root directory is created. FIG. 4 illustrates an example of the completed tree based on the tree data structure fragments 305-307 of FIG. 3.

Because the change detector 210 is obtaining data from a live system, changes may occur even while the change detector 210 is obtaining the data. When obtaining information for an object to fill in a parent node of a node of the tree, the change detector 210 may also obtain a journal number associated with the object. If during phase two a journal number is encountered that is higher than any journal number previously encountered while reading the change journal, the change detector 210 may return to phase one and read the change journal (from where it left off previously). In one embodiment, the change detector 210 may read the change journal until it comes to the end of the change journal. In another embodiment, the change detector 210 may read the change journal until the higher journal number is reached. Reading the change journal helps the change detector 210 determine the changes that happened to objects of the file system that affect the protected namespace.

After phase one completes again, phase two starts again. This returning to phase one from phase two may occur again and again (up to a configurable limit) if in building the complete tree additional higher journal numbers are encountered. Finally, when the tree is completely built, the change detector has a stable snapshot of the file system hierarchy for the protected namespace. The change detector may walk the tree and obtain path information even while the file system continues to make changes inside and outside the protected namespace. The path information may be used to determine what changes affect objects of the protected namespace and what changes do not. The path information may also be used by the data protection engine 220 of FIG. 2 to backup files that have changed since the last backup.

Figure 5:
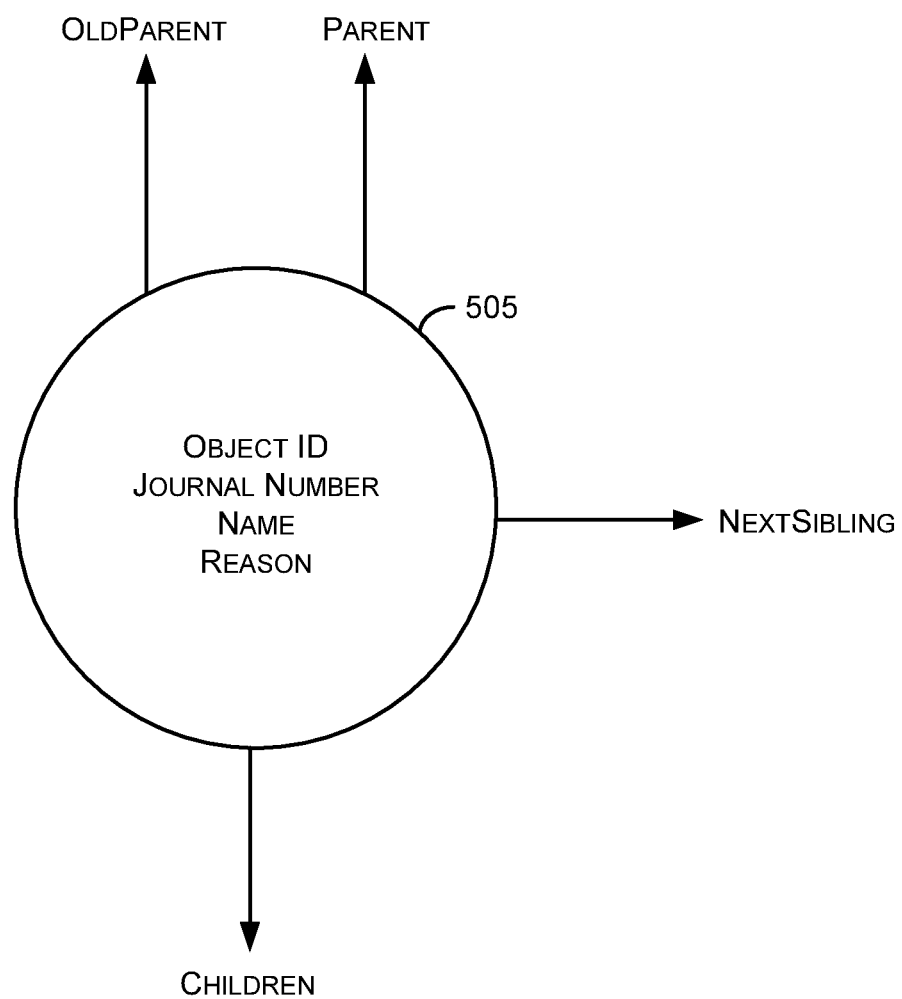
FIG. 5 illustrates exemplary fields of a node in accordance with aspects of the subject matter described herein.

FIG. 5 illustrates exemplary fields of a node in accordance with aspects of the subject matter described herein. The node 505 may include an object identifier, a journal number, a name, and change action(s) and may also include an indication (e.g., pointer to or identifier of) of an old parent, a current parent, a next sibling, children, and other fields. Below is an exemplary structure definition that includes some additional fields:

```
struct TreeNode {
    ULONGLONG  FID;             // Identifier for the file.
    ULONGLONG  JournalNum;      // Highest journal number seen for this file.
    DWORD      FileAttributes;  // Attributes bitmask obtained from GetFileAttributes
    WCHAR      Name[256];       // Combining these from parent nodes yields the full
                                // path.
    WCHAR      OldName[256];    // In case of a rename, the original name.
    BOOL       OldBackup;       // Indicates if the original path was in the previous
                                // protection scope.
    BOOL       NewBackup;       // Indicates if the current path is in the current protection
                                // scope.
    BYTE       Actions;         // A bitmask of values that indicates changes
    TreeNode*  Parent;
    TreeNode*  OldParent;       // In case of a rename, the original parent.
    TreeNode*  NextSibling;
    TreeNode*  Children;
};
```

The Actions field may include a bitmask of values that indicate what has happened to an object. Some examples of actions include add, edit, delete, and the like. If desired, a hash table may be maintained to efficiently find nodes in tree fragments based on file identifiers.

Returning to FIG. 2, as the change detector 210 reads the change journal to create nodes of a tree structure, records in the change journal may indicate multiple changes for some of the objects indicated by the records. For example, a file may be created; then the file may be edited; then the file may be deleted; and the like. Instead of reporting each of these changes separately for each node to the data protection engine 220, the change detector may consolidate changes for a node into a single action code (e.g., by putting them in the bitmask Actions field above) and return the single action code to the data protection engine.

Figure 6:
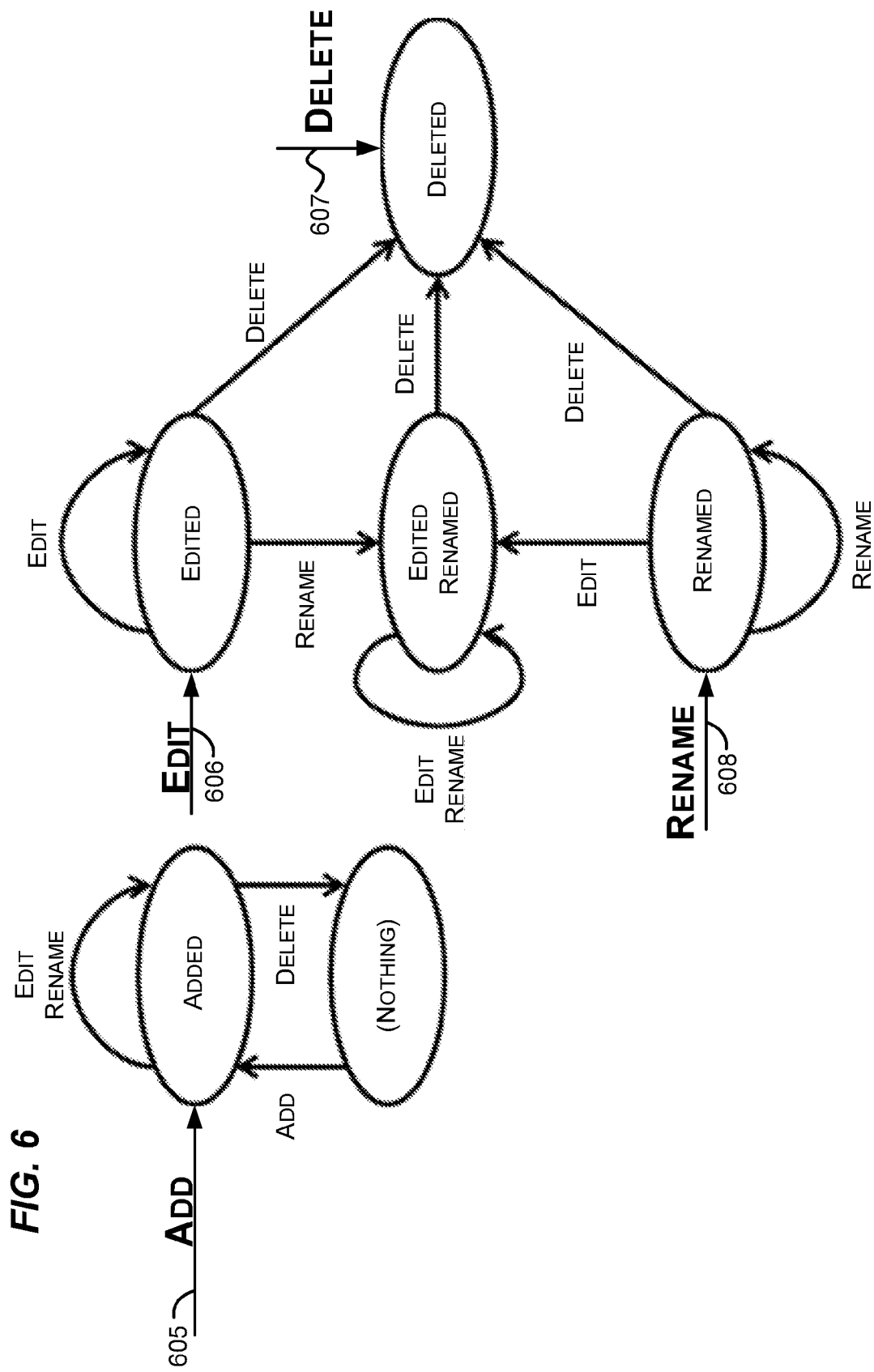
FIG. 6 is a state diagram that represents an exemplary way to update the action code for each changed object in accordance with aspects of the subject matter described herein.

FIG. 6 is a state diagram that represents an exemplary way to update the action code for each changed object in accordance with aspects of the subject matter described herein. The lines 605-608 are the "entry points" into the state diagram for objects previously not seen. Depending on the change (e.g., add, edit, delete, or rename), one of the lines 605-608 is followed if a node representing the object is not in the tree data structure yet. After entering a state, the state changes depending on what subsequent changes are made to the object. For example, if a file was added and then deleted, the status code for the node may be marked as "deleted" or the node may be completely removed as the file did not exist except between backups.

When a rename operation is detected in the change journal, fields in a node may be updated to indicate the new parent of the node and the original parent (e.g., using OldParent above) so that the original path can be constructed.

After the tree structure is complete, nodes in the tree may be marked to indicate whether they were previously or are currently in a data protected namespace. In this phase, the OldBackup and NewBackup members of each tree node may be updated as appropriate. OldBackup indicates whether an object was in the data protected namespace previously, while NewBackup indicates that an object is in the current data protected namespace. OldBackup and New-Backup may be marked as follows:

| Category | Action Taken |
| --- | --- |
| Previously protected | Mark OldBackup = True |
| Previously excluded | Mark OldBackup = False |
| Currently protected | Mark NewBackup = True |
| Currently excluded | Mark NewBackup = False |

When this phase begins, OldBackup and NewBackup for each node may be set to Unknown. For each node representing a directory that is configured for data protection, OldBackup and NewBackup may then be set according to the table above. In one embodiment, the root node of the tree is implicitly not backed up so both of its backup members are set to False.

After the actions above, the nodes of the tree are visited. To set the OldBackup, a node looks at its old parent, and to set NewBackup, the node looks at its new parent.

In some implementations, when a directory is renamed, the change journal may contain entries only for the directory and not any of the directories descendants. In this case, if the directory is moved from an unprotected namespace to a protected namespace, the change detector 210 may act as if there were add records for all descendant objects of the directory. For example, the change detector 210 may create nodes for the descendant objects and fill in status codes that the objects were created. Likewise, if the directory is moved from a protected namespace to an unprotected namespace, the change detector 210 may act as if there were delete records for all descendant objects of the directory and create nodes accordingly. NewBackup and OldBackup may be used to determine if a folder was moved between a protected and an unprotected namespace.

One exemplary algorithm for creating and marking new nodes is as follows:

```
ForEach Node in Tree
    If Node.OldBackup != Node.NewBackup
        Action = OldBackup == False ? DPEV_CREATE :
        DPEV_DELETE
        FindFirstFile
        While FindNextFile
            CreateChildNode
            PopulateChildNode
        EndWhile
        ForEach ChildNode under Node
            ChildNode.Actions = Action
        End ForEach
    End If
End ForEach Loop
```

When the change detector 210 goes from phase two to phase one (e.g., in response to encountering a higher journal number than previously seen), the tree nodes may be unmarked by walking the tree and setting each node's OldBackup and NewBackup members to Unknown. This is done as there may be additional rename events in the newly scanned portion of the change journal.

To obtain changes that have occurred since the last backup, the data protection engine 220 may provide a journal number to the change detector 210 and request that the change detector 210 detect changes that occurred after the journal number. In response, the change detector 210 may respond with the highest journal number encountered by the change detector 210 in detecting changes. The data protection engine 220 may then store and use this highest journal number the next time it asks for the change detector 210 to detect changes. In this way, only new records in the change journal are scanned.

Figure 7:
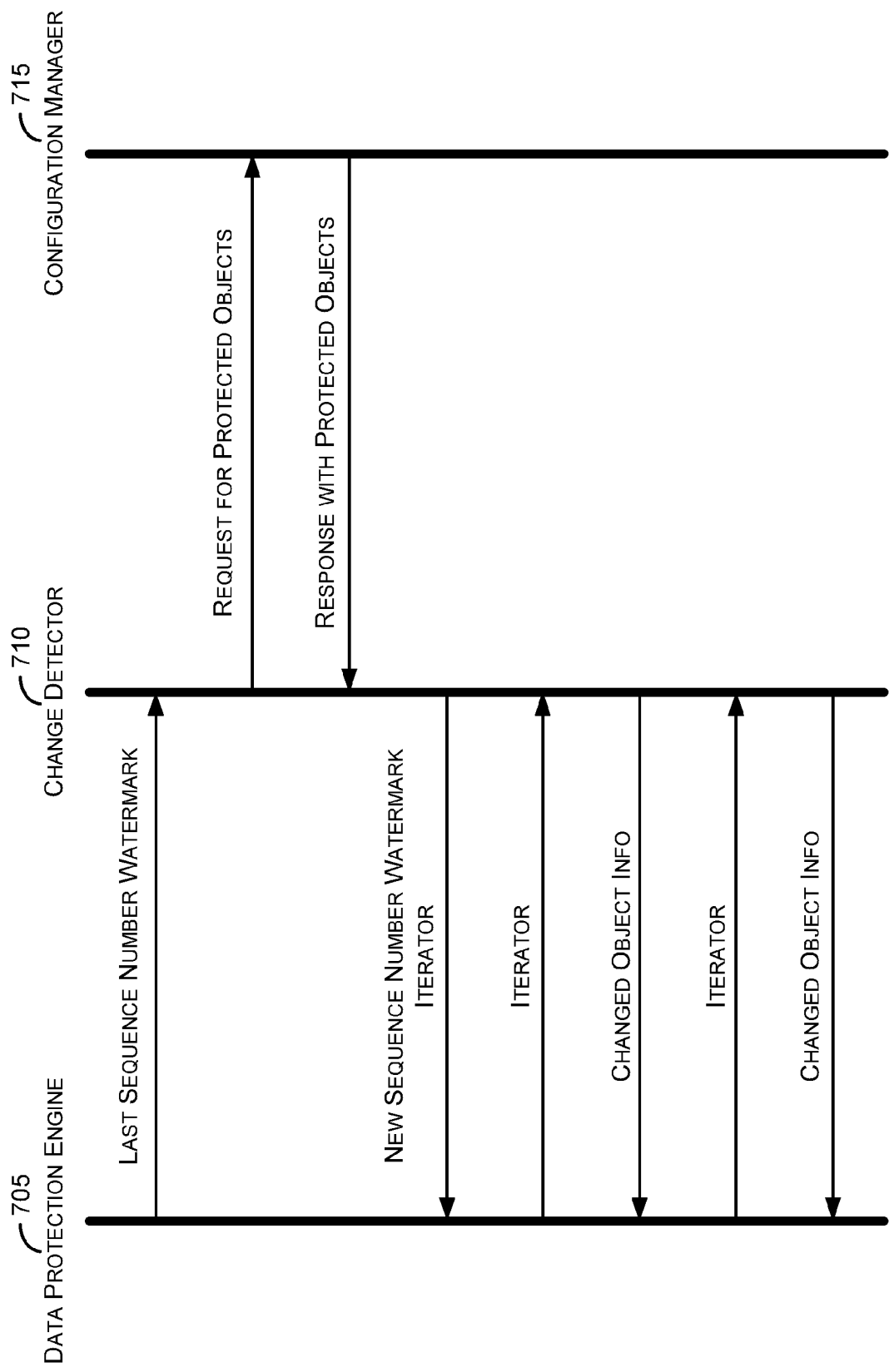
FIG. 7 is a timing diagram that illustrates an exemplary sequence of events in accordance with aspects of the subject matter described herein.

After the change detector 210 has responded with the highest journal number it encountered in detecting changes, the data protection engine 220 may then start requesting object information for each of the objects that have changed. FIG. 7 is an exemplary timing diagram that illustrates this sequence of events in accordance with aspects of the subject matter described herein.

In FIG. 7, the data protection engine 705 sends the last sequence number watermark (e.g., the highest journal number returned by the change detector 710 in a prior iteration) to the change detector 710. In response, the change detector 710 may send a request for protected objects to the configuration manager 715. In response, the configuration manager 715 informs the change detector 710 of one or more objects that are to be protected.

The change detector 710 then scans the change journal and creates a tree structure as previously indicated. Afterwards, the change detector 710 provides a new sequence number watermark (i.e., the new highest journal number encountered). The change detector 710 also provides and an iterator (e.g., some value or data structure) by which the data protection engine 705 may request changed object information. The data protection engine 705 stores the new sequence number watermark and uses the iterator to obtain change information for the objects that have changed.

Figure 8:
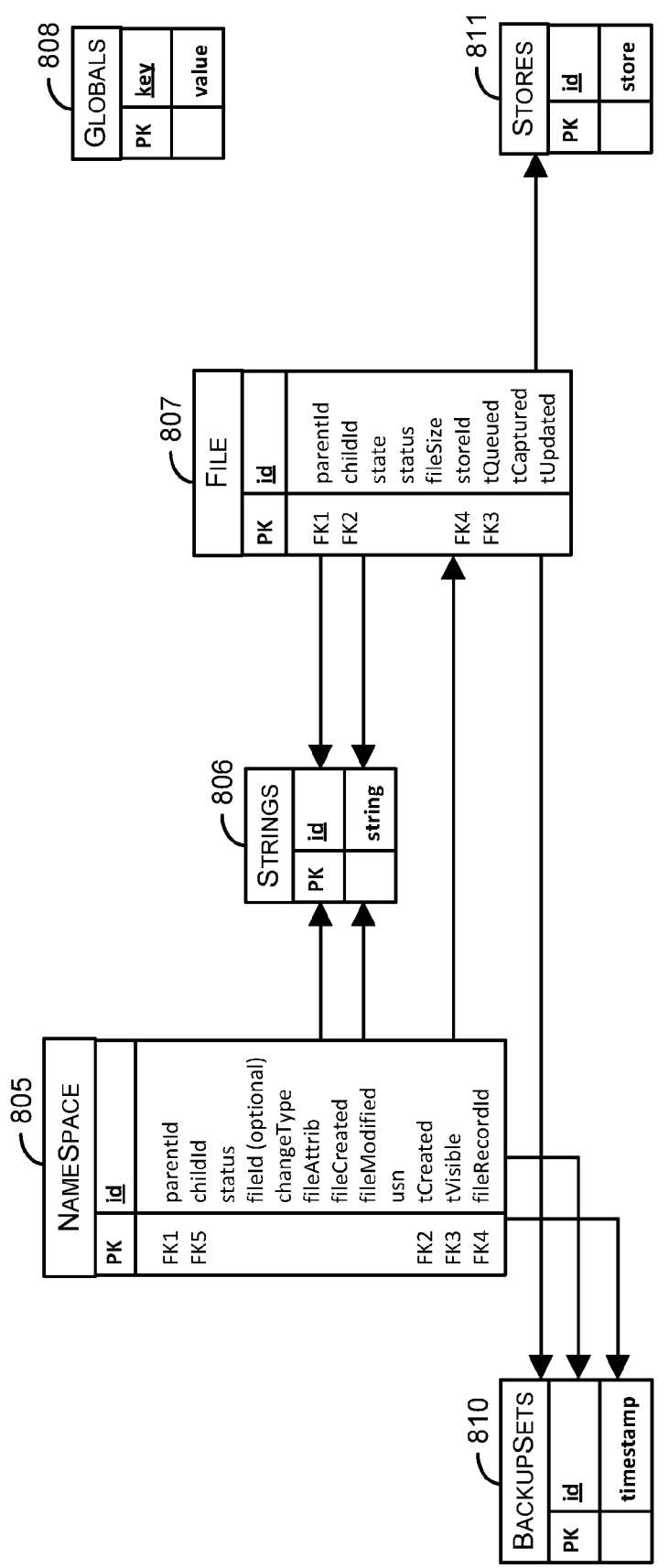
FIG. 8 is a block diagram that generally represents an exemplary schema that may be used for a catalog in accordance with aspects of the subject matter described herein.

Returning to FIG. 2, in iterating through files that have changed and in backing up files, the data protection engine 220 may update a catalog stored on the catalog store 232 via the catalog manager 225. FIG. 8 is a block diagram that generally represents an exemplary schema that may be used for a catalog in accordance with aspects of the subject matter described herein.

Turning to FIG. 8, the schema 800 may include a namespace table 805, a strings table 806, a file table 807, a globals table 808, a backup sets table 810, a stores table 811, and other tables (not shown).

The tables 805-811 may be stored in one or more databases. These databases may include relational databases, object-oriented databases, hierarchical databases, network databases, other types of databases, some combination or extension of the above, and the like. Data stored in a database may be organized in tables, records, objects, other data structures, and the like. The data stored in a database may be stored in dedicated database files, dedicated hard drive partitions, HTML files, XML files, spreadsheets, flat files, document files, configuration files, other files, and the like. A database may reference a set of data that is read-only to the database or may have the ability to read and write to the set of data.

Data in a database may be accessed via a database management system (DBMS). A DBMS may comprise one or more programs that control organization, storage, management, and retrieval of data of a database. A DBMS may receive requests to access data in a database and may perform the operations needed to provide this access. Access as used herein may include reading data, writing data, deleting data, updating data, a combination including two or more of the above, and the like.

In describing aspects of the subject matter described herein, for simplicity, terminology associated with relational databases is sometimes used herein. Although relational database terminology is sometimes used herein, the teachings herein may also be applied to other types of databases including those that have been mentioned previously.

The namespace table 805 in the schema 800 may include the lifetime and identifier of a particular version of a file. Most changes encountered by a data protection engine may be represented by a row in both the namespace table 805 and the file table 807. Some cases, however, such as an object rename or a directory change, may have only a namespace table record.

For example, in the case of file renames, storing an extra copy of a renamed file may be avoided by pointing a new namespace record to the last file record in the file version's lineage. This "pointing" may be performed by inserting a reference to the last file record in the fileRecordId field of the new namespace record. In one embodiment, there are no records in the file table 807 for folder changes as these changes may be determined by records in the namespace table 805.

The table below indicates fields of the namespace table 805 together with descriptions.

| Column | Description |
| --- | --- |
| id | Primary key |
| parentId | Foreign key that points to the parent directory string in the strings table |
| childId | Foreign key that points to the child object (file or folder) string in the strings table |
| fileId (optional) | File identifier that persists through file moves and renames |
| status | Reflects the status of this record. This field may have the following flags set:<br>1. Last in lineage-set when a file is deleted or renamed; indicates that the next namespace record for the same name likely describes a completely different file<br>2. Directory-the record describes a directory<br>3. No content change-the record describes a namespace change without a change in the file content<br>4. Restored-set on namespace records describing older versions restored on the source<br>5. Not active yet-indicates that the version described by namespace record is not to be shown to the user, and that the previous namespace record may still be visible |
| fileAttrib | File Attributes at the time of backup |
| fileCreated | File Created Time at the time of backup |
| fileModified | File Last Modified Time at the time of backup |
| usn | Journal number at the last journal scan, at the last attempt to backup the file, when the file was actually backed up, or when the file was restored |
| tCreated | Foreign key that points to the Backup Set time in the backupsets table when the file or folder was backed up |
| tVisible | Foreign key that points to the Backup Set time in the backupsets table |
| fileRecordId | Foreign key that points to the associated record in the file table when present |

The tCreated and tVisible fields may be used to determine a period of time when a version of a file or folder was visible in a namespace. This period of time extends from the tCreated time to the tVisible time. The tVisible field may be set to a certain value (e.g., −1) to indicate that the record is within the current namespace. This indicates the object associated with the record is considered visible in the current namespace.

Figure 9:
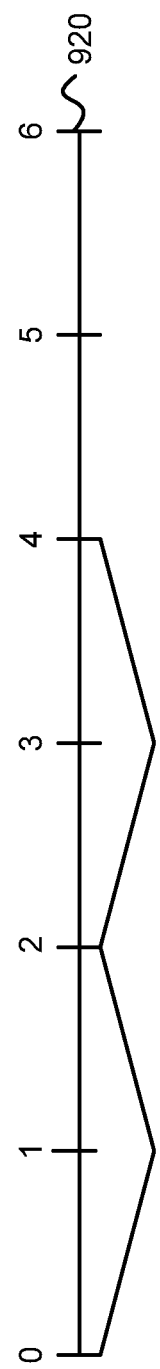
FIG. 9 shows a timeline of an object in accordance with aspects of the subject matter described herein. Each number of the axis 920 represents a different time.

For example, FIG. 9 shows a timeline of an object in accordance with aspects of the subject matter described herein. Each number of the axis 920 represents a different time (e.g., perhaps a different backup set time). At times 0-4 the object existed. Somewhere before time 2 the object was changed. At time 4, the object no longer existed.

The data protection engine 220 of FIG. 2 may create a new namespace record for the object at time 0 and time 2. If the object is a file, at time 0 and at time 2, the data protection engine 220 may also create a file record for the object and backup the object.

When the file is backed up at time 0, a namespace record may be created with a tCreated of 0 and a tVisible of (−1) (meaning that the version is currently visible in the namespace). In conjunction with backing up the file at time 2, a new namespace record may be created and given a tCreated of 2 and a tVisible of (−1). After the file is successfully backed up, the previous namespace record may be updated such that tVisible=2. This takes the previous namespace record out of the current namespace. A query of objects that existed at time 3 would include the version of the object that existed at time 3, but not a version of the object that existed before time 2 or after time 4.

This methodology in updating the namespace records allows the namespace to be viewed for any point-in-time. For example, to determine whether the file version existed at a time, a query may be performed on the string table to find a string identifier (StringID) associated with the file name (e.g., find C:\foo\bar→StringID=1). With the string identifier, the namespace table may be searched to find a string identifier equal to the string identifier found above and a time condition (e.g., where time>=tCreated and (time<=tVisible or time==−1)).

Likewise, to determine all the files that existed at a particular time, a query may be performed on the namespace table with just a time condition (e.g., return all file names where time>=tCreated and (time<=tVisible) or tVisible==−1)).

Similarly, other queries may be issued to determine, for example, all versions of a file, all files within a directory at a particular time, all changes to objects at a particular time within a folder, other information, and the like.

The status field above may be used differently for files as compared to directories. For example, for files, a NoContentChange flag in the status field means that file content has changed since the last backup or that the file referenced is a new file that was not protected before. For directories, if the NoContentChange flag is set, this means that one of more files in the exact directory (versus a subdirectory of the directory) were added, updated, renamed or removed at time=tCreated of the directory, or one or more subdirectories started or ceased to exist in that directory at time=tCreated. The field tCreated of the namespace record for the directory is the same as tCreated of the namespace record for the direct descendant that was updated.

The status field may also be used to determine whether an object is the last in its lineage (i.e., the object has been deleted). For example, when an object is deleted or renamed, the version prior to the delete or rename operation becomes the last version in the lineage. Unless the object is renamed back to its previous name, the next namespace record referencing a file having the same name describes a different file. When the status field includes a LastInLineage flag, this indicates that the object is the last in its lineage. For example, referring to FIG. 9, the file version that exists from time 2 to time 4 is the last in its lineage.

The fileAttrib, fileCreated, and fileModified fields may be used during restore of a file. For example, in conjunction with restoring the content of a file, these attributes may also be restored.

Returning to FIG. 8, the file table 807 represents file mapping and properties for each file in staging or on a backup target. The table below indicates fields of the file table 807 together with descriptions.

| Column | Description |
| --- | --- |
| id | primary key |
| parentId | Foreign key that points to the parent directory string in the strings table |
| childId | Foreign key that points to the child object (file or folder) string in the strings table |
| state | Reflects whether a record needs any action for backup |
| status | Reflects the status of the file version |
| fileSize | Size of the file in bytes; may be used to prioritize backups |
| storeId | Foreign key that points to an entry in the stores table |
| tQueued | The backup set when the file was queued for backup; this may be used to prioritize backups |
| tCaptured | The backup set when the file was backed up or, if backup took multiple cycles, the backup set when file backup actually started |
| tUpdated | The backup set for when the record was updated for the last time before it was fully backed up to the target or the staging area |

Each time the data protection engine wakes up to execute a backup, a new backup set is created. All of the objects backed up in a session will be a part of the same backup set. This may be represented by setting the tCreated values to the same backup set ID.

Furthermore, when a file is deleted or modified, its previous version is no longer valid in the current namespace. To indicate this, the previous version's tVisible may be set to the Id of the current backup set −1.

The storeID may be used to find backup copies of a file on one or more storage devices. The storeID may be used to reference a record of the stores table 811. Each of the records found in the stores table 811 may further indicate a particular store upon which a backup copy of the file can be found.

The strings table 806 may be used to remove duplicate strings. For example, for a file that has not been renamed, all versions of the file share the same parent path and filename. Likewise, all objects that reside in the same directory have the same parent path. The strings field in the strings table 806 may store string values for parent paths and object names.

The globals table 808 may be used to store global values. For example, the last sequence number watermark may be stored in the globals table 808. The value field of the globals table 808 may be able to store a blob of binary data so as to be able to store a variety of data.

The backup sets table 810 includes a primary key and a timestamp of when each backup set was created. The timestamp may reflect real world time, a monotonically increasing value that is incremented with each backup set, or some other value representing a temporal ordering.

The stores table 811 includes a primary key and an identifier of a store on which a backup copy of a file exists.

When a file is renamed but not modified in other ways, the file does not need to be backed up again. The schema illustrated in FIG. 8 allows a data protection engine to indicate that the file has moved within the namespace without requiring that the file be backed up again. In particular, this may be represented by adding a record to the namespace table 805, potentially adding a record in the strings table 806 (to include the new name), and setting the fileRecordId in the newly added namespace record to point to the file record that existed prior to the file being moved.

Returning to FIG. 2, as mentioned previously, the data protection engine 220 obtains change information from the change detector 210 and updates the catalog on the catalog store 232 as appropriate. The data protection engine 220 may also backup files that have changed since the last backup.

FIGS. 10-13 are flow diagrams that generally represent exemplary actions that may occur in accordance with aspects of the subject matter described herein. For simplicity of explanation, the methodology described in conjunction with FIGS. 10-13 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Figure 10:
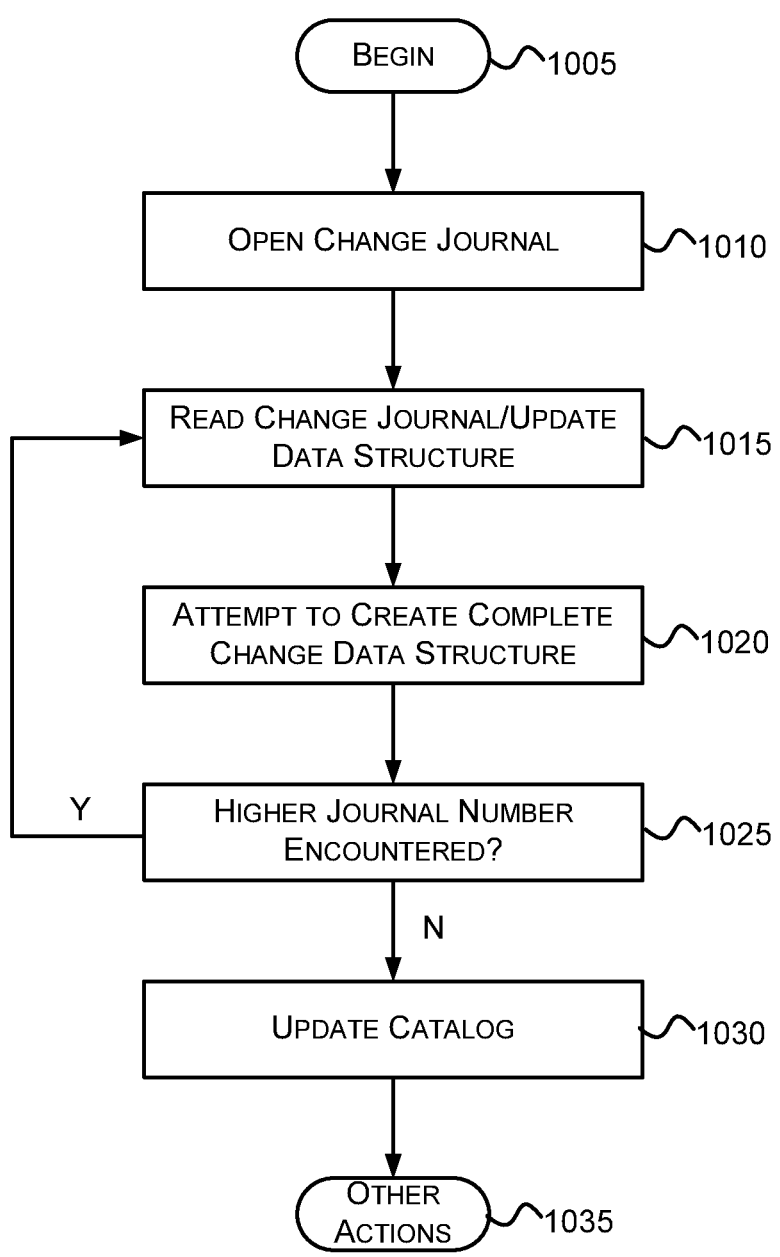
FIGS. 10-13 are flow diagrams that generally represent exemplary actions that may occur in accordance with aspects of the subject matter described herein.

Turning to FIG. 10, at block 1005, the actions begin. At block 1010, a change journal is opened for reading. For example, referring to FIG. 2, the change detector 210 may open a change journal on the source store 230. As mentioned previously, the change journal may include records that indicate file system objects that have changed. Changed may include edited, deleted, created, moved to/from a protected namespace, and the like. The file system objects indicated by the change journal may be included in a file system that may be located on a single storage device or that may be distributed across multiple storage devices.

At block 1015, the change journal is read and a data structure is updated in conjunction with reading the change journal. This reading of the change journal may potentially occur in parallel with additional records being written to the change journal. For example, referring to FIG. 2, the change detector 210 may read records of the change journal for the source store 230 and may fill in data of the tree data structure therefrom as previously mentioned. In one embodiment, each of the change journal may include name information of a changed file system object and parent thereof, but may not include a complete path of the change file system object of the parent thereof.

At block 1020, after reading the records of the change journal, a change detector may attempt to complete the data structure so that the data structure indicates paths of the file system object that have changed. In doing this, the change detector may consult with a live file system to obtain the path information as previously indicated. For example, referring to FIGS. 2-4, the change detector 210 may attempt to create the tree data structure illustrated in FIG. 4 from the fragments 305-307 of FIG. 3 together with path information obtained from a live file system. The change detector 210 may do this by querying for parent objects of the oldest ancestor node of each of the fragments 305-307 until a root node is found. With each parent object, additional path information may be obtained together with a sequence number (also sometimes referred to as a journal number) associated with the parent object.

Updating data in the data structure from the change journal may include, for example, reading a file name of a file associated with the record, reading a sequence number of the file, reading an identifier of a parent of the file, and putting the file name, sequence number, and identifier in a child node of the data structure.

If a parent node for the parent of a file does not exist in the data structure, the parent node may be created and link data inserted into the parent node to identify the child node. If the parent node for the parent of the file does exist in the data structure, the tree data structure may be updated to indicate that the child node is a child of the parent node. For example, in one implementation, this may be done by updating a NextSibling pointer.

At block 1025, if a higher journal number is encountered during the actions of block 1020, the actions continue at block 1015; otherwise, the actions continue at block 1030. A change detector may determine if a file system object reflected in the data structure has changed after reading the change journal by comparing a sequence number of the object with a last read sequence number of the change journal. If the sequence number of the object is larger, the change detector may then know that a change has occurred. For example, referring to FIG. 2, if the change detector 210 finds a higher journal number than it has previously encountered, the change detector 210 may go back to phase one and begin reading the change journal again. The change detector 210 may use the additional records updated from the change journal to update the tree data structure.

At block 1030, the catalog is updated using the data structure created by the change detector. For example, referring to FIG. 2, the data protection engine 220 may iterate the changes determined by the change detector 210 and make changes to the catalog store 232 to update namespace and file records as previously indicated. For example, after a version of an object has been successfully backed up to a backup target, the data protection engine 220 may update a timestamp for the version in the catalog to indicate that the version is no longer visible in the current namespace.

The effect of making the changes to the catalog is that the catalog may then be used to view the namespace at any of the backup set time covered by the catalog. In one embodiment, the term backup set time refers to a logical time at which a backup set for backup is created. The time may reflect real world time, a monotonically increasing value that is incremented with each backup set, or some other value representing a temporal ordering.

In another embodiment, the term backup set time refers to a time placed in the backup sets table 810 of FIG. 8. Each time the data protection engine is able to successfully execute and obtain records that indicate objects that need to be backed up, the data protection engine may associate each of the objects in the backup set with a backup set time. At the backup set time, the protected namespace has a certain structure that may be obtained from the catalog and used to view the state of the protected namespace.

At block 1035, other actions, if any, may be performed.

Figure 11:
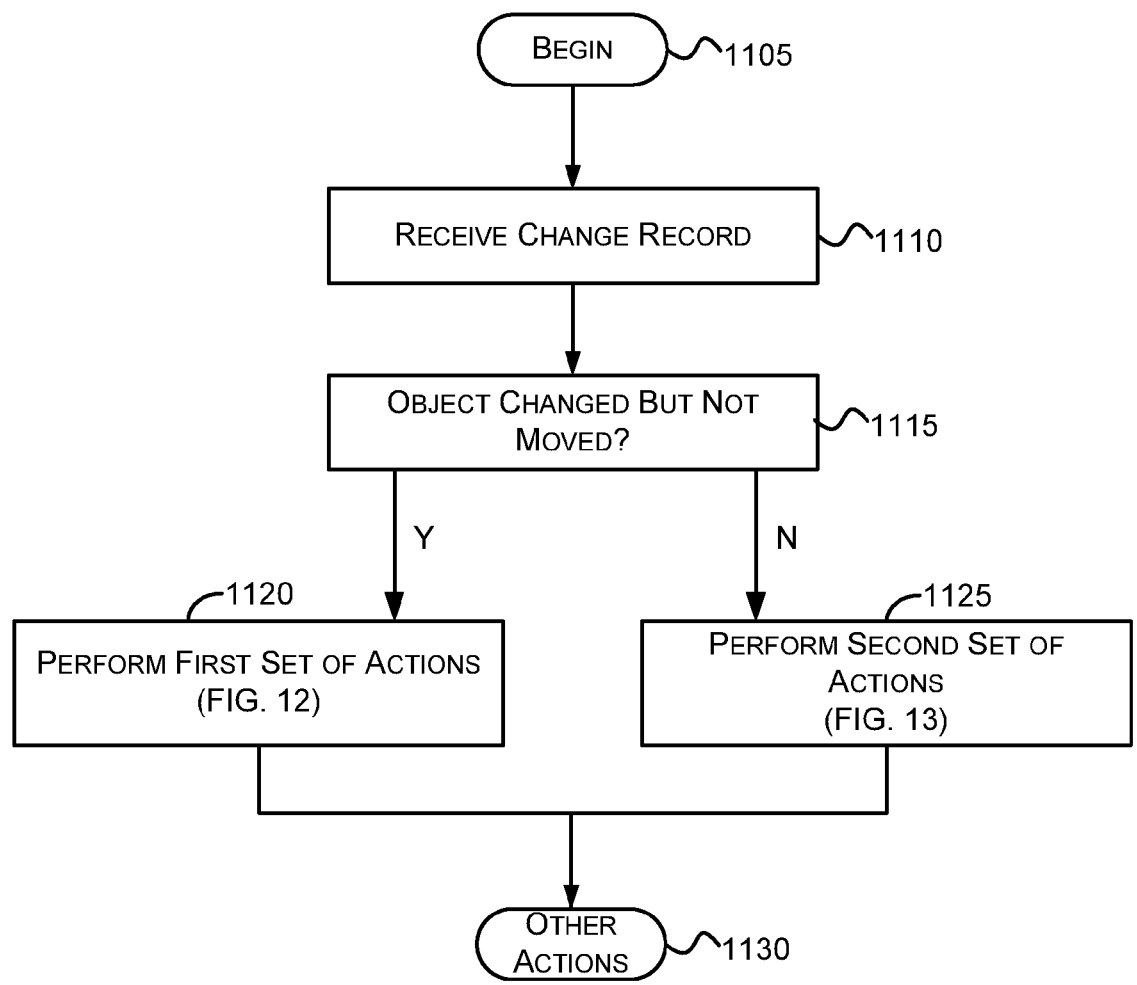
Figure 12:
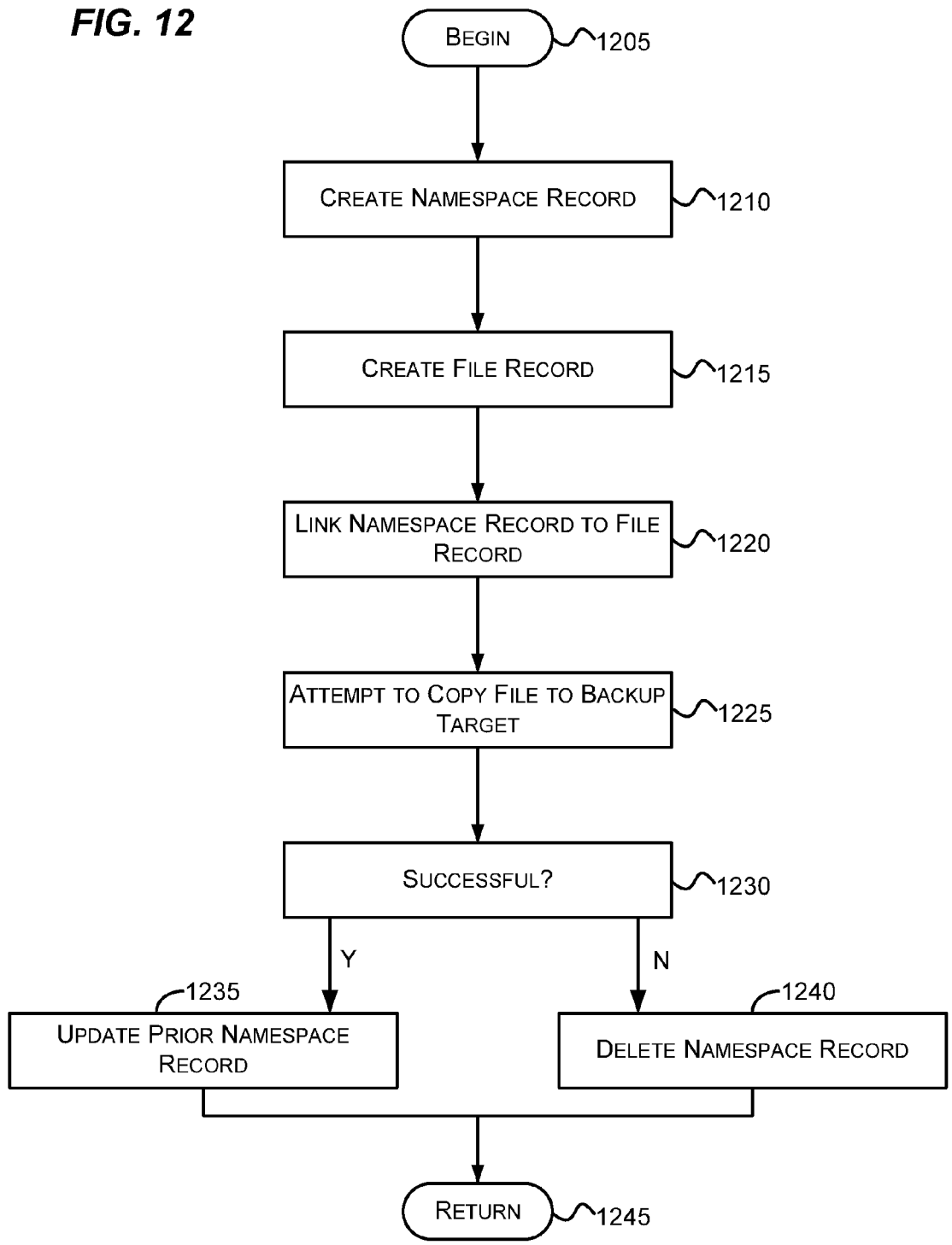
Figure 13:
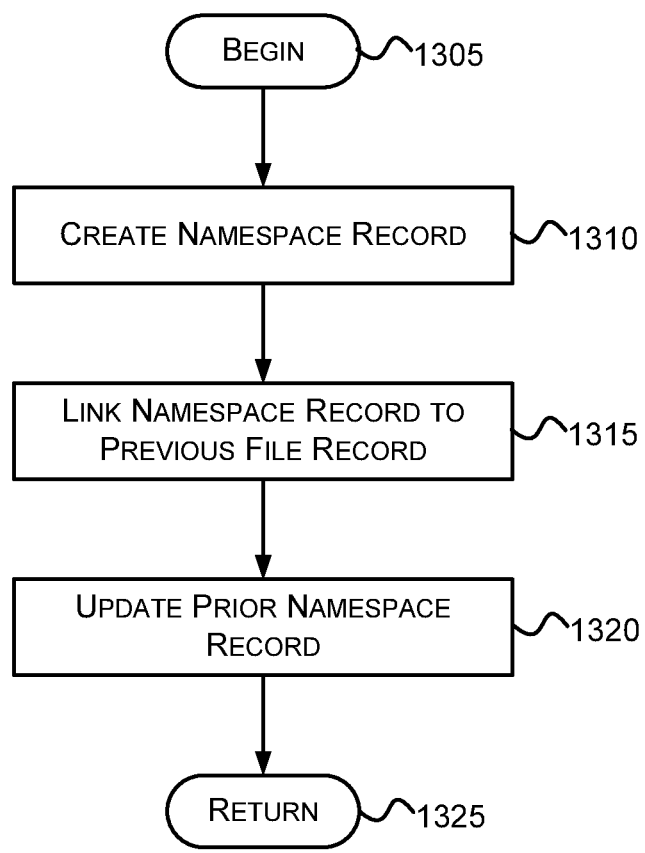

FIGS. 11-13 are flow diagrams that generally represent exemplary actions that may occur in updating a catalog in accordance with aspects of the subject matter described herein. Turning to FIG. 11, at block 1105, the actions begin.

At block 1110, a change record is received that indicates a change that has occurred to an object. As mentioned previously, the term "a" may mean that the change record refers to one or more multiple changes that have occurred. For example, referring to FIG. 2, the data protection engine 220 may receive a change record from the change detector 210 regarding a file of the source store 230. The change record may indicate that the file has been moved, changed, deleted, renamed, and/or the like.

At block 1115, if the object was deleted or changed but not moved, the actions continue at block 1120; otherwise, the actions continue at block 1125.

At block 1120, a first set of actions is performed as indicated in more detail in conjunction with FIG. 12.

At block 1125, a second set of actions is performed as indicated in more detail in conjunction with FIG. 13.

At block 1130, other actions, if any may be performed. For example, one or more parent directory namespace records may be modified to indicate that an underlying file has changed.

Turning to FIG. 12, at block 1205, the actions begin. If the object was deleted, the tVisible flag in the namespace record corresponding to the object may be set to indicate that the object is no longer visible in the current namespace and the actions may continue at block 1130 of FIG. 11. Otherwise, at block 1210, a new namespace record is created. For example, referring to FIG. 2, the data protection engine 220 may create a new namespace record in the catalog in response to receiving the change record from the change detector 210.

At block 1215, a new file record may be created. For example, referring to FIG. 2, the data protection engine 220 may create a new file record in the catalog in response to receiving the change record from the change detector 210.

At block 1220, the new namespace record may be linked to the new file record. For example, referring to FIGS. 2 and 8, the data protection engine 220 may instruct the catalog manager 225 to link the new namespace record to the new file record. The catalog manager 225 may do this by updating the foreign key field fileRecordID in the namespace record of the namespace table 805.

At block 1225, an attempt to copy the file to a backup target may be performed. For example, referring to FIG. 2, the data protection engine 220 may attempt to copy the file to the backup store 231. If this is successful, the actions may continue at block 1235; otherwise, the actions may continue at block 1240.

At block 1235, the prior namespace record may be updated to indicate that the prior namespace record is no longer visible in the current namespace. As mentioned previously, when the new version of a file is successfully backed up, the namespace record referring to the old version may be updated with a time that indicates the last time the old version was visible. This time may correspond to the backup set timestamp. After this time is updated, queries for the objects of the current namespace will no longer return the old version. For example, referring to FIGS. 2, 8, and 9 at time 2 of FIG. 9, after the version has been successfully copied to a backup target, the data protection engine 220 may instruct the catalog manager 225 to update the tVisible field of the namespace record to 1. This makes the namespace record "invisible" or not show up when queries for times after 1 are issued. In other words, if the current time is after 2, a query for the current namespace does not return a record for the previous version that was successfully copied to the backup target.

At block 1240, if the data protection engine is not able to successfully copy the version of the file to the backup target, the namespace record may eventually be deleted as well as the file record for the version. One result of this is the previous version may still be visible in the current namespace.

In one embodiment, a namespace record may not be deleted if a backup fails due to a transient error (e.g., due to the file being open by another application). In this embodiment, the namespace record is left in the catalog and another backup is attempted (starting at block 1225) during a subsequent backup cycle of the data protection engine.

At block 1245, the actions continue at block 1130 of FIG. 11.

Turning to FIG. 13, at block 1305, the actions begin. Recall that the actions of FIG. 13 are reached if a file is moved but not changed. For example, if a file is moved from one protected directory to another protected directory and is not changed in other ways (e.g., the content changed), the actions of FIG. 13 may occur.

At block 1310, a namespace record is created for the received record. For example, referring to FIG. 2, the data protection engine may utilize the catalog manager 225 to create a new namespace record in response to a file being moved.

At block 1315, the new namespace record is linked to the previous file record that represented the file system object. For example, referring to FIGS. 2 and 8, the data protection engine 220 may instruct the catalog manager to update a fileRecordID field of the new namespace record to refer to the previous file record that represented the object.

At block 1320, the previous namespace record may be updated. For example, referring to FIGS. 2, 8, and 9, after the new namespace record is created and linked to the prior file record, the data protection engine 220 may cause the previous namespace record that referred to the file to be marked as invisible in the current namespace by changing the tVisible field of the previous namespace record.

At block 1325, the actions continue at block 1130 of FIG. 11.

Figure 14:
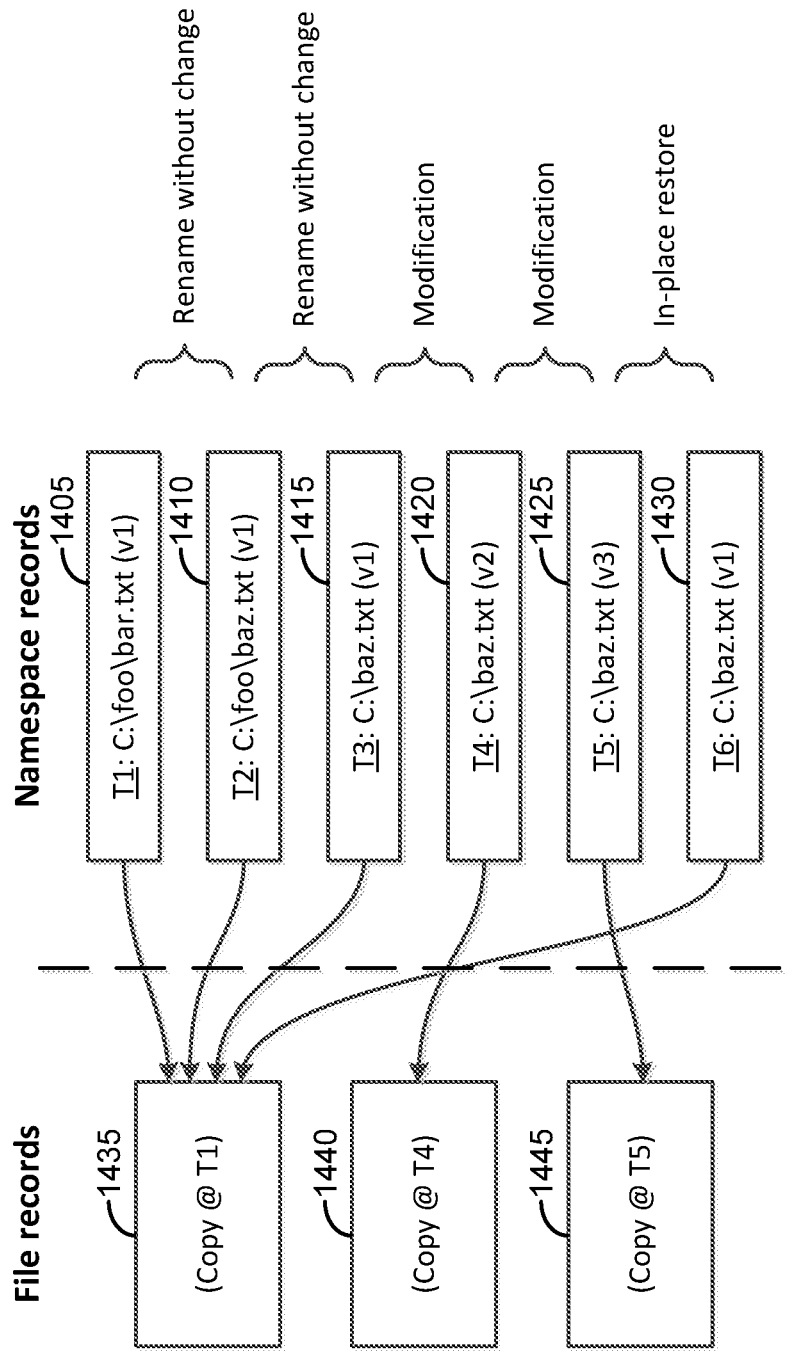
FIG. 14 is a block diagram that generally represents an exemplary set of changes to a catalog in response to object changes in accordance with aspects of the subject matter described herein.

FIG. 14 is a block diagram that generally represents an exemplary set of changes to a catalog in response to object changes in accordance with aspects of the subject matter described herein. As illustrated, at T1, a namespace record 1405 for the file c:\foo\bar.txt exists and is linked to a file record 1435.

Between times T1 and T2, the file is moved (e.g., renamed) from c:\foo\bar.txt to c:\foo\baz.txt, but the file is not otherwise changed. In response, at time T2, a new namespace record 1410 is created for the file and this new namespace record is linked to the previous file record 1435.

Between the times T2 and T3, the file is again moved (e.g., renamed) but the file is not otherwise changed. In response, at time T3 a new namespace record 1415 is created for the file and this new namespace record is linked to the previous file record 1435.

Between the times T3 and T4, the file is changed but not moved. In response, at time T4, a new namespace record 1420 is created as well as a new file record 1440. The new namespace record 1420 is linked to the new file record 1440.

Between the times T4 and T5, the file is again changed, but not moved. In response, at time T5, a new namespace record 1425 is created as well as a new file record 1445. The new namespace record 1425 is linked to the new file record 1445.

Between the times T5 and T6, the first version of the file is restored to c:\baz.txt. In response, at time T6, a new namespace record is created and linked to the file record 1435. It can be seen that the methodology above may reduce the number of file records needed for name space changes.

As can be seen from the foregoing detailed description, aspects have been described related to backups and change journals. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method performed on a computing device, the method comprising:
   creating, based on records of a change journal, a plurality of tree data structure fragments that are not connected together in a single tree data structure that includes a root node, where each of the records corresponds to a file system object that has been changed in a file system;
   building a data structure from the single tree structure using the plurality of tree data structure fragments combined with path information obtained from a live instance of the file system, where the built single tree structure includes the root node;
   updating a catalog of file system objects in a protected namespace using the data structure; and
   creating backup sets of changed file system objects in the protected namespace from the updated catalog.

2. The method of claim 1, where each of the records includes name information of a file system object and a parent thereof.

3. The method of claim 1, where each of the records is associated with a number that indicates a sequence of the each of the records in the change journal.

4. The method of claim 3, further comprising determining if a file system object reflected in the built single tree structure changed after the creating, the determining based on comparing a sequence number of the file system object with a highest sequence number of the change journal.

5. The method of claim 1 further comprising updating a catalog based on the built single tree structure, where the updated catalog is configured for providing a view of a namespace of any backup set covered by the updated catalog.

6. The method of claim 1 further comprising creating, based on the obtained path information and in response to a parent node corresponding to a parent object of a changed file system object not existing in the created tree data structure fragments, the parent node and connecting the created parent node into the tree data structure.

7. The method of claim 1 further comprising backing up, according to the built tree data structure, at least a portion of the changed file system objects.

8. The method of claim 5 where the updating the catalog comprises updating a timestamp of the catalog, where the updated timestamp indicates creation of a backup set.

9. At least one computer-readable storage media not consisting of propagated signals storing computer-executable instructions that, when executed by a computing device, cause the computing device to perform actions comprising:
creating, based on records of a change journal, a plurality of tree data structure fragments that are not connected together in a single tree data structure that includes a root node, where each of the records corresponds to a file system object that has been changed in a file system;
building a data structure from the single tree structure from the plurality of tree data structure fragments combined with path information obtained from a live instance of the file system, where the built single tree structure includes the root node;
updating a catalog of file system objects in a protected namespace using the data structure; and
creating backup sets of changed file system objects from the updated catalog.

10. The at least one computer storage media of claim 9, where each of the records includes name information of a file system object and a parent thereof.

11. The at least one computer storage media of claim 9, where each of the records is associated with a number that indicates a sequence of the each of the records in the change journal.

12. The at least one computer storage media of claim 9, the actions further comprising determining if a file system object reflected in the built single tree structure changed after the creating, the determining based on comparing a sequence number of the file system object with a highest sequence number of the change journal.

13. The at least one computer storage media of claim 9, the actions further comprising updating a catalog based on the built single tree structure, where the updated catalog is configured for providing a view of a namespace of any backup set covered by the updated catalog.

14. The at least one computer storage media of claim 13, the action further comprising creating, based on the obtained path information and in response to a parent node corresponding to a parent object of a changed file system object not existing in the created tree data structure fragments, the parent node and connecting the created parent node into the tree data structure.

15. The at least one computer storage media of claim 9, the actions further comprising backing up, according to the built tree data structure, at least a portion of the changed file system objects.

16. A system, comprising:
one or more processors; and
one or more computer-readable storage media not consisting of propagated signals storing computer-executable instructions that, when executed by the one or more processors, cause the system to perform actions comprising
creating, based on records of a change journal, a plurality of tree data structure fragments that are not connected together in a single tree data structure that includes a root node, where each of the records corresponds to a file system object that has been changed in a file system;
building a data structure from the single tree structure from the plurality of tree data structure fragments combined with path information obtained from a live instance of the file system, where the built single tree structure includes the root node,
updating a catalog of file system objects in a protected namespace using the data structure; and
creating backup sets of changed file system objects from the updated catalog.

17. The system of claim 16, the actions further comprising updating a catalog based on the built single tree structure, where the updated catalog is configured for providing a view of a namespace of any backup set covered by the updated catalog.

18. The system of claim 17 where the updating the catalog comprises updating a timestamp of the catalog, where the updated timestamp indicates creation of a backup set.

19. The system of claim 16, the actions further comprising backing up, according to the built tree data structure, at least a portion of the changed file system objects.

20. The system of claim 16, where each of the records includes name information of a file system object and a parent thereof.

* * * * *